N. WILLIARD.
CAR FENDER.
APPLICATION FILED MAR. 14, 1911.
1,001,792.
Patented Aug. 29, 1911.
2 SHEETS—SHEET 2.
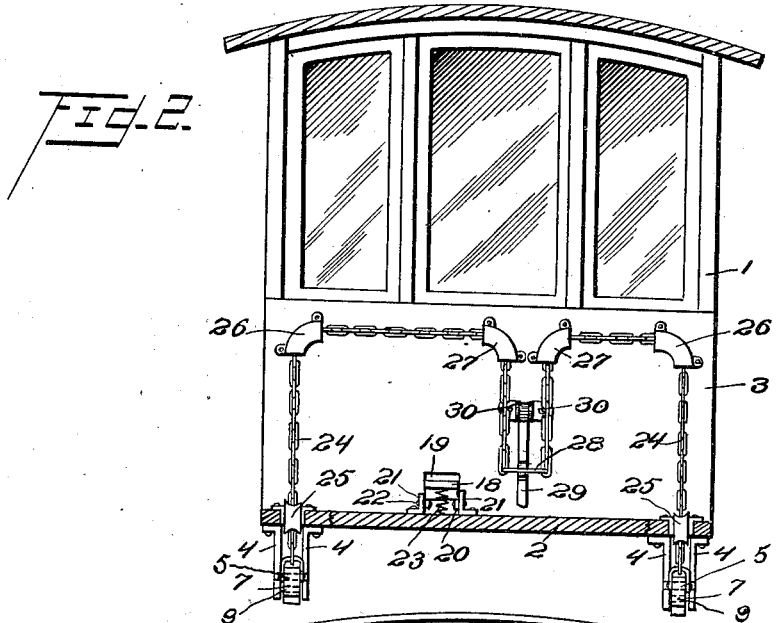
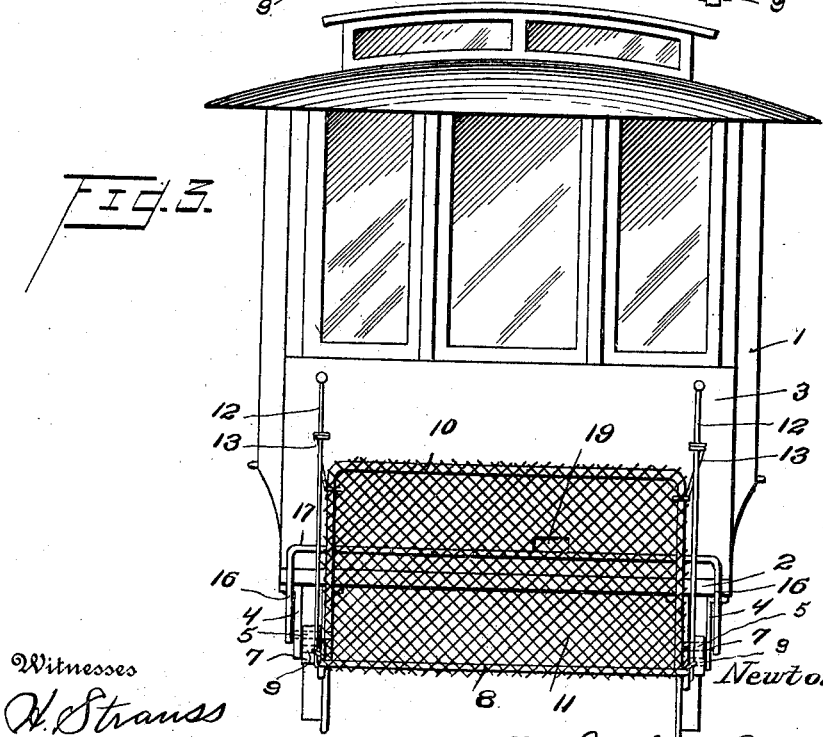
Witnesses
H. Strauss
R. H. Krenkel
Inventor
Newton Williard
By Joshua R. H. Potts,
Attorney

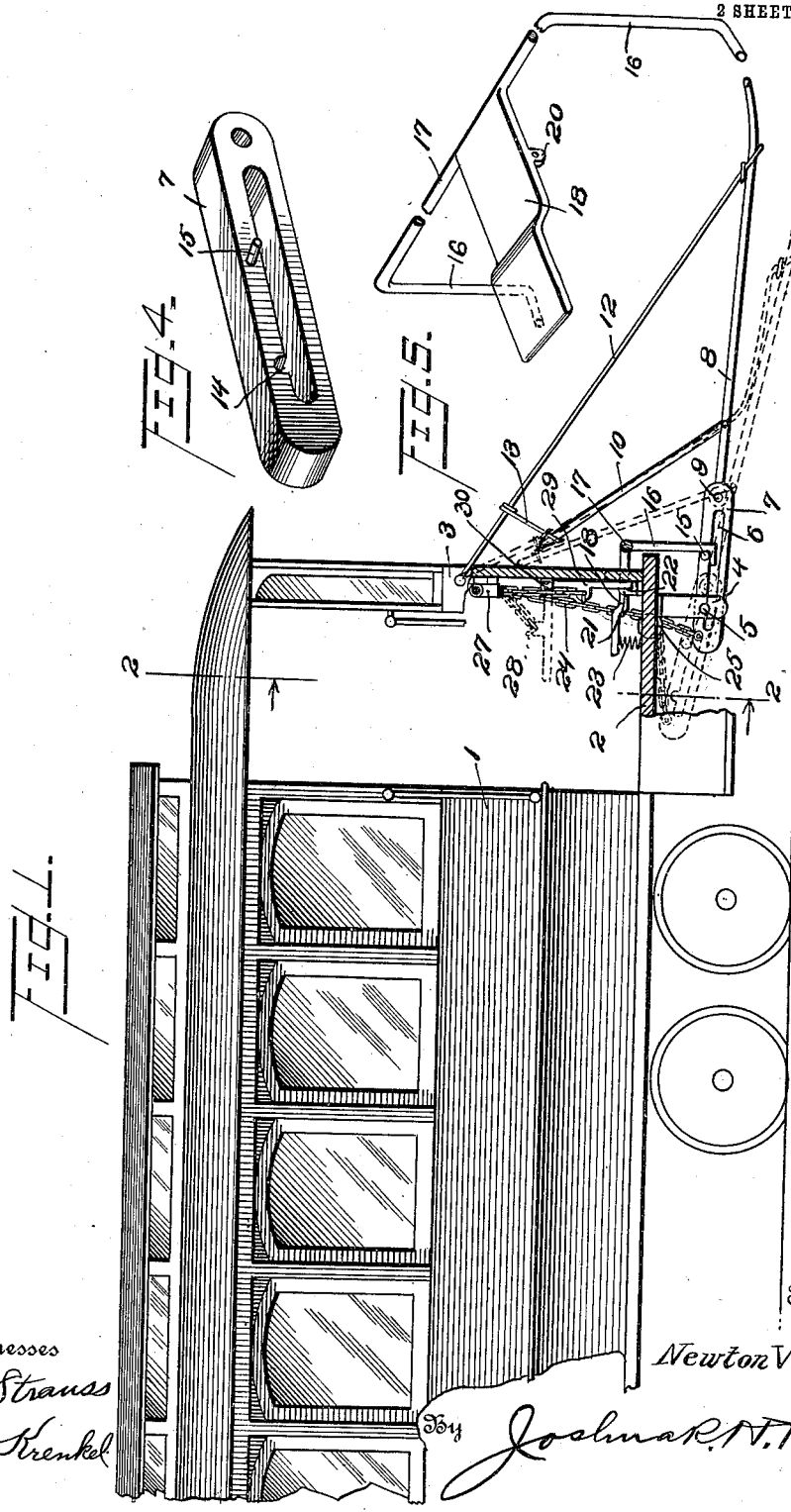

UNITED STATES PATENT OFFICE.

NEWTON WILLIARD, OF TRENTON, NEW JERSEY.

CAR-FENDER.

1,001,792.  Specification of Letters Patent.  Patented Aug. 29, 1911.

Application filed March 14, 1911. Serial No. 614,327.

*To all whom it may concern:*

Be it known that I, NEWTON WILLIARD, a citizen of the United States, residing at Trenton, in the county of Mercer and State of New Jersey, have invented certain new and useful Improvements in Car-Fenders, of which the following is a specification.

My invention relates to improvements in car fenders, the object of the invention being to provide a fender which is normally held in elevated or set position, but which may be released from such position by the motorman, and will then move downwardly and rearwardly so as to locate the forward end of the fender in close proximity to the track, and insure the picking up of a person or object on the track.

A further object is to provide improved means for holding the fender in its forward elevated set position, to provide improved means for releasing the fender from its set position, and provide improved means for returning the fender to its set position.

A further object is to provide a fender of this character which will be of comparatively simple inexpensive construction, and which will be strong and durable to withstand the necessary hard usage to which a device of this kind is put.

With these and other objects in view, the invention consists in certain novel features of construction and combinations and arrangements of parts, as will be more fully hereinafter described and pointed out in the claims.

In the accompanying drawings: Figure 1, is a view partly in side elevation, and partly in section illustrating my improved fender in position on a car, the fender being shown in full lines in normal set position, and in dotted lines in its tripped and dropped position to pick up a person or object on the track. Fig. 2, is a view in section on the line 2—2 of Fig. 1. Fig. 3, is a view in end elevation of the fender in its normal set position. Fig. 4, is a perspective view on an enlarged scale of one of the slotted bars 7, and Fig. 5, is a perspective view of the foot lever 18.

1, represents a car having the ordinary platform 2 and dash board 3. Depending brackets 4 are secured to the under face of platform 2 near the sides of the platform, and are provided with pins 5. These pins 5 project through longitudinal slots 6 in bars 7, and to the forward ends of these bars 7, side bars 8 of my fender are rigidly secured by pins 9. The fender 8 is preferably provided with the upwardly and rearwardly projecting hinged section 10, and this section, as well as that between the bars 8, is preferably provided with rope netting illustrated at 11. Ropes 12, connect the forward ends of the fender with the dash board 3, and shorter ropes 13, preferably connect the hinged section 10 with ropes 12, so as to support this section in its normal position. The upper walls of the slots 6 are recessed near their rear ends as shown at 14, for the reception of the pins 5 in the brackets 4 to hold the fender in its forwardly projecting raised position, as shown in full lines in Fig. 1.

On each bar 7, a laterally projecting lug 15 is provided, and under these lugs the L-shaped depending arms 16 of a transversely disposed bar 17 project. This bar 17, centrally between its ends, is made integral with a foot lever 18. This foot lever 18 projects through an opening 19 in dash board 3, and is provided with depending perforated ears 20, which register with similar ears on a bracket 21, fixed to platform 2, and through these perforated ears pivot pins 22 are provided to pivotally connect the lever. A coiled spring 23 is positioned below the rear end of lever 18, so as to normally hold the lever, the rod 17, and the arms 16, in the position shown in Fig. 1, the opening 19 limiting this downward pivotal movement of the forward end of said lever.

The bars 7 are connected to chains 24, which project through openings in the platform 2, and over pulleys 25. These chains then pass through elbow guides 26 and 27, secured to the dash board 3, and the chains then extend downwardly and are connected by a cross pin 28, with a lever 29. Lever 29 is pivotally connected to one end to brackets 30 secured to platform 3, and this lever is normally in the position shown in full lines in Fig. 1.

The operation is as follows: The parts are normally in the position shown in full lines in Fig. 1. If the motorman sees a person or object on the track, and cannot stop his car before contact with said person or object, he depresses the foot lever 18. This causes arms 16 to be elevated, and said arms, by reason of their engagement with the lugs 15, lift the bars 7 far enough to release said bars from locked engagement with the pins 5. Because the preponderance of weight of the fender is forwardly of the lug 15, when the arms 16 elevate, the tendency of the forward end of the fender is to go down, pivoting on the lugs 15, so that the bars 7 will lift off of the pins 5, and when lifted far enough off of such pins 5, the weight of the fender will move the same rearwardly as shown in dotted lines. Furthermore, this action would be assisted when the fender struck a person or object, and even though it did not move rearwardly until such time, it would probably do so then.

When the bars are thus released, the weight of the fender will cause it to swing downwardly, and the ropes 12 will compel it to swing rearwardly to the position shown in dotted lines in Fig. 1, so that the fender lies close to the track, and must pick up the person or object. This rearward swinging motion of the fender serves to cushion the contact with the person or object, so while the fender may not assume its lowest position by gravity due to its own weight, it will assume such position when the fender contacts with the person or object. When the fender moves to the position shown in dotted lines, the chains 24 will be moved so as to swing lever 29 out from the dash board as shown in dotted lines in Fig. 1. To return the fender to set position, it is simply necessary to press the lever 29 downwardly, thus drawing the fender forwardly until the recesses 14 engage over the pins 5, when the fender will be set ready to repeat the operation above described.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a car fender, the combination with bars having longitudinal slots therein, recesses in the upper walls of said slots, of a fender secured to the forward ends of said bars, a flexible connecting device adapted to connect the forward end of the fender with the fixed part of the car, brackets depending from the platform, pins in said brackets normally positioned in the recesses in said bars, and means for lifting said bars to release them from locked engagement with said pins, whereby said fender is permitted a downward and rearward movement, substantially as described.

2. In a car fender, the combination with bars having longitudinal slots therein, recesses in the upper walls of said slots, of a fender secured to the forward ends of said bars, a flexible connecting device adapted to connect with the forward end of the fender with the fixed part of the car, brackets depending from the platform, pins in said brackets normally positioned in the recesses in said bars, means for lifting said bars to release them from locked engagement with said pins, whereby said fender is permitted a downward and rearward movement, and means for drawing said bars and fender back to normal elevated position, substantially as described.

3. In a car fender, the combination with bars having longitudinal slots therein, recesses in the upper walls of said slots, of a fender secured to the forward ends of said bars, a flexible connecting device adapted to connect the forward end of the fender with the fixed part of the car, brackets depending from the platform, pins in said brackets normally positioned in the recesses in said bars, a foot lever, pins on said bars, and L-shaped arms connected to said foot lever and positioned below said pins, substantially as described.

4. In a car fender, the combination with bars having longitudinal slots therein, recesses in the upper walls of said slots, of a fender secured to the forward ends of said bars, a flexible connecting device adapted to connect the forward end of the fender with the fixed part of the car, brackets depending from the platform, pins in said brackets normally positioned in the recesses in said bars, a foot lever, pins on said bars, L-shaped arms connected to said foot lever and positioned below said pins, and means for exerting a forward pull on said bars to move them to set position, substantially as described.

5. In a car fender, the combination with bars having longitudinal slots therein, recesses in the upper walls of said slots, of a fender secured to the forward ends of said bars, a flexible connecting device adapted to connect the forward end of the fender with the fixed part of the car, brackets depending from the platform, pins in said brackets normally positioned in the recesses in said bars, a foot lever, pins on said bars, L-shaped arms connected to said foot lever and positioned below said pins, a pivoted lever, and flexible connecting devices connecting said last mentioned lever with said bars, whereby the movement of said last mentioned lever in one direction draws said bars to elevated set position, substantially as described.

6. The combination with a car, a platform thereon, and a dash board on said platform, of brackets depending from said platforms, slotted bars having recesses in the upper walls of their slots, pins in said brackets normally positioned in said recesses and holding said bars in forward set position, a fender secured to said bars, flexible connecting devices secured to the forward end of the fender and to said dash board, and means for elevating said bars to release them from locked engagement with said pins, whereby said fender is permitted a rearward and downward movement, substantially as described.

7. The combination with a car, a platform thereon, and a dash board on said platform, of brackets depending from said platform, slotted bars having recesses in the upper walls of their slots, pins in said brackets normally positioned in said recesses, and holding said bars in forward set position, a fender secured to said bars, flexible connecting devices secured to the forward end of the fender and to said dash board, means for elevating said bars to release them from locked engagement with said pins, whereby said fender is permitted a rearward and downward movement, and means on said dash board for moving said bars and fender to normal set position, substantially as described.

8. The combination with a car, a platform thereon, and a dash board on said platform, of brackets depending from said platform, slotted bars having recesses in the upper walls of their slots, pins in said brackets normally positioned in said recesses, and holding said bars in forward set position, a fender secured to said bars, flexible connecting devices secured to the forward end of the fender and to said dash board, a foot lever pivotally supported on the platform, an integral transversely positioned rod on said foot lever, pins on said slotted bars, and L-shaped arms integral with said rod and engaging under said last-mentioned pins, whereby the movement of said foot lever lifts said bars out of locked engagement with the first-mentioned pins, substantially as described.

9. The combination with a car, a platform thereon, and a dash board on said platform, of brackets depending from said platform, slotted bars having recesses in the upper walls of their slots, pins in said brackets normally positioned in said recesses, and holding said bars in forward set position, a fender secured to said bars, flexible connecting devices secured to the forward end of the fender and to said dash board, a foot lever pivotally supported on the platform, an integral transversely positioned rod on said foot lever, pins on said slotted bars, L-shaped arms integral with said rod and engaging under said last-mentioned pins, whereby the movement of said foot lever lifts said bars out of locked engagement with the first-mentioned pins, a lever pivoted to the dash boards, and chains connecting said lever with said bars, whereby the movement of said lever in one direction moves said bars forward, substantially as described.

In testimony whereof I have signed my name to this specification in the presence of two subscribing witnesses.

NEWTON WILLIARD.

Witnesses:
R. H. KRENKEL,
CHAS. E. POTTS.

Copies of this patent may be obtained for five cents each, by addressing the "Commissioner of Patents, Washington, D. C."